United States Patent [19]

Mülhaupt et al.

[11] Patent Number: 5,369,171

[45] Date of Patent: Nov. 29, 1994

[54] IN SITU POLYMER ALLOYS AND MICROCOMPOUNDS, PROCESS FOR THEIR MANUFACTURE, AND USE THEREOF

[75] Inventors: Rolf Mülhaupt, Freiburg; Joachim Rösch, Gundelfingen; Siegfried Hopperdietzel, Selb; Ekkehard Weinberg, Schönwald; Herbert Klein, Hof/Saale, all of Germany

[73] Assignee: Rehau AG + Co., Rehau, Germany

[21] Appl. No.: 895,368

[22] Filed: Jun. 10, 1992

[30] Foreign Application Priority Data

Jun. 11, 1991 [DE] Germany ............................ 4119146

[51] Int. Cl.$^5$ ............................................ C08L 77/02
[52] U.S. Cl. ..................................... 525/66; 525/178; 525/184; 525/432
[58] Field of Search ................... 525/432, 178, 184, 66

[56] References Cited

FOREIGN PATENT DOCUMENTS 0408166  1/1991  European Pat. Off. .
4018549  12/1991  Germany .
2060649  5/1981  United Kingdom .

OTHER PUBLICATIONS

L. J. Mathias, et al., J. Polym. Science Polym. Chem. V. 25, 2699–2709 (1987).
Moore et al., "Molecular Composites via in Situ Polymerization: Poly(Phenylene Terephthalamide)-Nylon 3," Journal of Applied Polymer Science, vol. 32 (1986), pp. 6299–6315.
Sikes et al., "Synthesis and Characterization of In Situ Anionically Polymerized P-Aminobenzoylcaprolactam Using Di- and Tri-Functional Initiator Systems," Polymer Bulletin 18 (1987), pp. 397–401.
Takayanagi et al., "Polymer Composites of Rigid and Flexible Molecules: System of Wholly Aromatic and Aliphatic Polyamides", J. Macromol. Sci.-Phys., B17(4), 591–615 (1980).
Mathias et al., "Polymerization of N-(p-aminobenzoyl) caprolactam: Block and Alternating Copolymers of Aromatic and Aliphatic Polyamides", J. Polymer Science, Pt. A: Polymer Chemistry, vol. 25, 2699–2709 (1987).
Synthec, 9403 Goldach, 1 (1989).

Primary Examiner—James J. Seidleck
Assistant Examiner—I. Zemel
Attorney, Agent, or Firm—Spencer, Frank & Schneider

[57] ABSTRACT

A polymer mixture reinforced by an in situ, melt-polymerized microphase whereby the rigidity of the base material is increased, a process for manufacturing same, and use thereof for providing reinforced compositions and articles in which the polymer mixture is prepared by polymerizing a component B in a melt of a component A composed of at least one thermoplastic polymer. Component B is composed of at least one compound having the structure

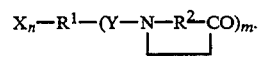

The reaction of component B in a melt of component A results in linear, branched or cross-linked, high or low molecular weight polymers constituting a microphase. Preferably, the microphases have the form of microfibers. In the structure of component B, X is $NH_2$, $NHR^3$, OH or an N-substituted, Y-activated lactam of the

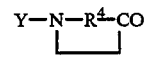

type which is activated with an electrophilic substituent Y, where Y is CO, $SO_2$, or $R^5P{=}O$; $R^1$, $R^2$ and $R^4$ are bivalent or multivalent aliphatic-, aromatic-, heterocyclic- or heteroatom-containing segments, with $R^2$ and $R_4$ preferably being bivalent aliphatic or aromatic radicals $(CH_2)_z$ in which $1 < z < 15$; $R^3$ and $R^5$ are aliphatic, cycloaliphatic or aromatic radicals; and n and m are integers for which $1 < m$ and $n < 5$, and preferably $m = n = 1$.

35 Claims, No Drawings

IN SITU POLYMER ALLOYS AND MICROCOMPOUNDS, PROCESS FOR THEIR MANUFACTURE, AND USE THEREOF

CROSS-REFERENCE TO RELATED APPLICATION

This application claims the priority of application Ser. No. DE-P 41 19 146.3 filed Jun. 11th, 1991 in Germany, the subject matter of which is incorporated herein by reference.

BACKGROUND OF THE INVENTION

1. Field of The Invention

The present invention relates to a novel polymer mixture which is a polymer reinforced thermoplastic polymer, such as an organic fiber reinforced thermoplastic polymer, to a process for its manufacture, and to use thereof for providing reinforced compositions and articles.

2. Background of The Art

Rigidity is an important characteristic of polymer materials, particularly polymeric construction materials. Frequently cost considerations, among other considerations, cause the development of such materials by incorporation of inorganic reinforcing substances, such as talcum, chalk, mica or glass fibers, into an insufficiently rigid polymer material matrix. The drawback of such a technique is that the impact strength of the reinforced material is generally reduced. At the same time, the addition of reinforcing substances tends to negatively influence other characteristics, for example, flow behavior and weldability. The worsening of such characteristics, moreover, becomes even more distinct as increasing amounts of reinforcing substances are added. It is therefore desirable to employ reinforcing substances having the greatest possible reinforcing effect and to employ them only in low concentrations. For industrial applications, fibrous reinforcing substances, particularly short and long glass fibers, are best suited in this respect. On the other hand, however, incorporation of such fibers requires that special measures be taken to prevent breaking the fibers during incorporation and often results in undesirable fiber markings on the finished surfaces of the workpieces.

In addition to inorganic reinforcing substances, rigid polymers are also employed as reinforcing polymers, i.e., stiffening agents for insufficiently rigid polymer material matrices. The mixture of polymers may be homogeneous or heterogeneous, that is, the mixture may be a single phase or a biphase mixture, and, in particular, the reinforcing polymer may be present in the mixture in the form of fibers. However, organic polymer fibers composed of thermoplastic polymers are not known to have any special reinforcing effect. An exception is stretched polyethylene fibers. Although stretched polyethylene fibers are very strong, their application for this purpose is limited. They cannot be employed, for example, for reinforcing polypropylene or polyamides because of their low melting point. Further, their non-polar character frequently requires that additional measures be taken to improve adhesion to the surrounding polymer matrix.

A reinforcing effect as exhibited, for example, by glass fibers, is likewise demonstrated by non-thermoplastic polyparabenzamides (aramids) when employed as short fibers in, for example, polyamide-66. They have the excellent advantage, compared to glass fiber reinforcements, that the extruded composite materials are isotropic in their strength behavior. The incorporation of prefabricated aramid fibers into thermoplastics in industry is expensive, however, as for glass fibers, in that care must be taken to avoid breakage of the fibers. Thus, uniform dispersion of aramid fibers in, for example, polyamide, is possible only with the use of special phase forming agents which ensure the bonding of the aramid fiber to the polyamide matrix (see synthec, 9403 Goldach, 1 (1989), pages 8–11). In polyamide-66, this process has been employed to increase the elastic modulus by 71% by adding 20 weight percent aramid fibers.

A further example of prior art use of an aramid as a reinforcing fiber is the incorporation of polyparaterephthalamide (PPTA) in polyamide-6 by way of precipitation from a common sulfuric acid solution thereof according to Takayanagi et al, *J. Macromol. Sci. Phys.*, B 17, page 591 (1980). During precipitation, PPTA forms microfibers which are dispersed in the polyamide-6 matrix. In this way, the modulus of elasticity of polyamide-6 may be almost doubled by addition of 5 weight percent PPTA fibers. Since PPTA is not meltable, however, it is not possible to produce a PPTA microfiber reinforced polyamide-6, by, for example, a melting-mixing process, so that these interesting substances produced according to the Takayanagi process would be obtainable only at considerable expense on an industrial scale.

Accordingly, it is an object of the present invention to provide a polymer mixture by a simple process for reinforcing a thermoplastic polymer with organic microphases suitable for industrial practice, which microphases preferably have the form of microfibers.

It is a further object of the present invention to reinforce a thermoplastic polymer A by reacting a monomer B in a melt of thermoplastic polymer A to form the most rigid possible linear, branched or cross-linked, high or low molecular weight reaction products.

It is yet another object of the present invention to reinforce a thermoplastic polymer A specifically with aramids as the reinforcing polymer by a melt process so that the technically expensive dispersion of prefabricated aramid fibers in, for example, a polyamide, is no longer necessary.

It is still another object of the present invention to reinforce a thermoplastic polymer A using a lower percentage of reinforcing polymer than used by the prior art while maintaining at least a comparable reinforcing effect so as to keep negative influences on characteristics, for example, weldability of the compound substance, as low as possible.

SUMMARY OF THE INVENTION

The present invention accomplishes these and other objects by providing a novel polymer mixture reinforced by an in situ, melt-polymerized microphase whereby the rigidity of the base material is increased, a process for its manufacture, and use thereof for providing reinforced compositions and articles.

The novel polymer mixture including microphases of melt-polymerized material in a thermoplastic polymer according to the present invention, is a polymer mixture comprising a component A composed of at least one thermoplastic polymer; and melt-polymerization reaction products of a component B (with or without component A) composed of at least one compound having the structure

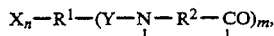

wherein X is $NH_2$, $NHR^3$, OH or an N-substituted lactam of the type

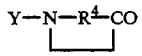

that is activated with an electron withdrawing, i.e., electrophilic, substituent Y, where Y is CO, $SO_2$, or $R^5P=O$; $R^1$, $R^2$ and $R^4$ are bivalent or multivalent, aliphatic-, aromatic-, heterocyclic- or heteroatom-containing segments; preferably $R^2$ and $R^4$ are bivalent aliphatic or aromatic radicals $(CH_2)_z$, where $1<z<15$, most preferably bivalent aliphatic radicals $(CH_2)_z$, where $1<z<15$; $R^3$ and $R^5$ are aliphatic, cycloaliphatic or aromatic radicals; and n and m are integers with $1<m$ and $n<5$, preferably $m=n=1$, the polymerization reaction products being linear, branched or cross-linked, high or low molecular weight polymers constituting microphases.

The present invention also provides a process for producing the above polymer mixture including melting a component A to provide a melt; and adding component B to the melt of component A.

Alternately, the present invention provides a process for producing the above polymer mixture including pre-mixing component A and component B at a temperature below the softening temperature of component A; and melting component A.

The present invention additionally contemplates use of the novel polymer mixture for providing reinforced compositions, such as a self-reinforcing plastic, a molding substance, an injection molding substance, an extrudate, an adhesive and a coating. The present invention additionally contemplates use of the novel polymer mixture to provide an article, such as a fiber (e.g., an elongate strand), a tube, a rod, a profiled member, a film (e.g., a film for flexible packaging), and a thin sheet (e.g., a thin sheet for deep drawing applications).

In the case where component B is reacted in a melt of component A to provide low or high molecular reaction products thereof and X represents an N-substituted lactam activated with an electrophilic substituent Y, at least one aliphatic, aromatic, araliphatic or cycloaliphatic diamine is added to component B. If one employs stiff-chained radicals $R^1$, a microcompound, i.e., a microcomposite, is formed which is characterized in that microphases composed of the reaction products of component B are dispersed in a continuous phase of component A. If the microphases are anisotropic and have a length to diameter ratio of $>1$, the rigidity of component A may be increased by the presence of the microphases.

To solve the aforementioned problems of the prior art, the present invention takes advantage of the fact that N-substituted lactams activated by electrophilic substituents and containing a further functional group are able to react with N-activated lactams to form higher molecular weight compounds. If, for example, p-aminobenzoyl caprolactams or p-aminobenzoyl laurinlactams, as described by L. J. Mathias, D. R. Moore and C. A. Smith in *J. Polym. Sci., Polyms., Chem. Ed.*, 25, page 2699 (1987), are polymerized either by lactam splitting at temperatures $<200°$ C. or by ring-opening polymerization at temperatures $>200°$ C., insoluble polyparabenzamides or mixed aromatic/aliphatic polyamides result which are not thermoplastically processible.

The present invention solves the above problem in that the polymerization of N-activated lactams which contain a further functional group, called component B, are effected in a melt of thermoplastics, called component A. In the case where component A is polyamide-6 and component B is N-(p-aminobenzoyl)-caprolactam, aromatic/aliphatic polyamide copolymers were formed which are dispersed as microfibers in polyamide-6. The addition of only 5 weight percent of component B, N-(p-aminobenzoyl)-caprolactam, raised the elastic modulus of the polyamide-6 to almost double. Due to the small dimensions of the fibers, moreover, the surface of molded pieces made from such a polymer mixture is smooth.

Novel and not predictable is the fact that the polyamide copolymers formed in the thermoplastic melt aggregate to form microfibers and do not aggregate as particles without a preferred axis or, as is customary for polymer mixtures produced by way of a melt, as a dispersed phase having, for example, a spherical shape or the shape of coarse fibers induced by expansion flow. The formation of anisotropic particles, i.e., microfibers, resulting from the polymerization of, for example, p-aminobenzoyl caprolactam in polyamide-6 or polypropylene according to the present invention is not dependent on expansion flow.

Also surprising was the discovery that the polymerization of p-aminoethyl benzoate which, in contrast to component B does not contain an activated lactam structure, does not lead to anisotropic particles in the melt of a thermoplastic material although the resulting poly-p-benzamides would also be able to form fibers.

The microfibers obtained when component B is N-(p-aminobenzoyl)-caprolactam according to the process of the present invention are not meltable until decomposed, are not soluble in sulfuric acid, are highly crystalline and, according to 13 C Solid State NMR, contain aliphatic and aromatic groups. Thus, the microfibers are aliphatic/aromatic polyamides.

It was therefore surprising that inventive microfibers obtained in polyamide-6 when p-aminobenzoyl caprolactam is polymerized in a melt of polyamide-6 exhibit a reinforcing effect which is comparable to that of polyparaterephthalamide microfibers (PPTA), introduced according to Takayanagi by precipitation from a sulfuric acid solution of polyamide-6 and PPTA, in spite of the existence of aliphatic groups resulting from ring openings in the lactam. The inventive microfibers produced a 78% increase in modulus of elasticity for the polymer mixture compared to a 67% increase for a polymer mixture according to Takayanagi from a PPTA having a molecular weight of about 1,000, i.e., 1,000 g/mole.

It has thus been found possible, in a manner not known before, to produce thermoplastic substances that are reinforced by high modulus microfibers as could not be obtained according to prior art manufacturing methods. Prior art manufacturing methods specifically for biphase polymer alloys on the one hand in which the two alloying partners are dissolved, could not produce the inventive polymer mixture since the dispersed phase is not soluble in the prior art solvents. On the other hand, the inventive polymer mixture could not be made by melt mixing according to prior art techniques since when component B is, for example, p-aminobenzoyl caprolactam, the polymerization product of component B is not meltable until decomposed.

Moreover, the method according to the invention is easily suitable for industrial applications while the above-mentioned prior art process of producing PPTA microfiber reinforced polyamide-6 by way of a sulfuric acid solution would be possible only with considerable expense.

Compared to pure polyamide-6, the in-situ polymer alloys according to the invention of polyamide-6 and only 5 weight percent p-aminobenzoyl caprolactam result in an increase of the modulus of elasticity to almost double the original value. Thus, the alloys attain the level of presently customary, higher valent, partially aromatic polyamides, for example, polyamide-46.

Of course, polymerization of N-activated caprolactams in a polymer melt according to the present invention may also produce polymer alloys whose polymer components are always thermoplastic, i.e., before and after polymerization. Depending on the phase diagram of the resulting polymer mixtures, homogeneous or multi-phase polymer mixtures including reinforcing microfibers can also be produced.

Component A is composed of thermoplastically processible, low and high molecular weight polymers, preferably polymers having a median molecular weight ($M_n$) of $1,000 < M_n < 700,000$. Suitable polymers for component A include one or a plurality of thermoplastic olefin homopolymers and copolymers of, for example, ethylene, propylene, butene-1, 4-methyl-1-pentene, 1-octene, 1-hexene, vinyl acetate, methacrylic acid and their derivatives, particularly methyl, ethyl and butyl esters; and styrēne, acrylonitrile, butadiene, vinyl chloride, maleic or fumaric acid and their derivatives, particularly maleic acid anhydride and fumaric acid diesters. The copolymerization must be performed in such a manner that component A can be processed thermoplastically, preferably at temperatures of $<100°$ C.

Moreover, component A may be composed of one or a plurality of polar, heteroatom-containing thermoplastic polymers. The term "heteroatom-containing" as used herein means that a segment may also have other than carbon atoms in the primary chain. Examples include polycondensates of aromatic, aliphatic, araliphatic, cycloaliphatic diols or diamines with aromatic, aliphatic, araliphatic, cycloaliphatic dicarboxylic acids or hydroxycarboxylic acids. Suitable diols include 1,2-ethylene glycol, 1,4-butylene glycol, neopentyl glycol, diethylene glycol, 1,4-cyclohexane diols, bisphenol A, 1,4- and 2,6-dihydroxynaphthalene, hydroquinone, 2-chlorohydroquinone, and 4,4'-dihydroxybiphenyl. Examples of suitable diamines include p-phenylene diamine, m-phenylene diamine, 4,4'-diaminobiphenyl, naphthalene diamine, and bis-(p-amino-benzoyl) functional compounds. Examples of suitable dicarboxylic acids include terephthalic acid, isophthalic acid, 4,4'-biphenyl dicarboxylic acid, succinic acid, adipinic acid, sebacinic acid, suberic acid, fumaric acid, and maleic acid. Examples of suitable hydroxycarboxylic acids include hydroxycaproic acid, and p-hydroxybenzoic acid. These monomer components can be copolymerized according to processes known to the person of average skill in the art.

Moreover, polyester carbonates, polycarbonates and polyethers, particularly polyphenylene ether, polyphenylene oxide and polyphenylene sulfide may be employed as component A. Component A may include amorphous, partially crystalline or liquid-crystalline polymers. Block copolymers or alloys of the above-described polymers may also be employed.

Component B is composed of at least one lactam compound, i.e., compounds having the structure

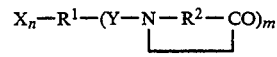

which is reacted into linear, branched or cross-linked, high or low molecular polymers. In the aforementioned structure, X is $NH_2$, $NHR^3$, OH or an N-substituted lactam of the

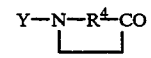

type which is activated with an electrophilic substituent Y, where Y is CO, $SO_2$, or $R^5P=O$; $R^1$, $R^2$ and $R^4$ are bivalent or multivalent aliphatic-, aromatic-, heterocyclic- or heteroatom-containing segments, $R^2$ and $R^4$ preferably representing a bivalent aliphatic or aromatic radical $(CH_2)_z$, where $1 < z < 15$, most preferably a bivalent aliphatic radical $(CH_2)_z$, where $1 < z < 15$, $R^3$ and $R^5$ are aliphatic, cycloaliphatic and aromatic radicals, and n and m are integers where $1 < m$ and $n < 5$, and preferably $m = n = 1$.

If the lactams are polyfunctional, with X likewise representing an N-activated lactam, then diols or diamines, preferably 1 mole of OH or $NH_2$ per mole of N-activated lactam, are added to component B in order to convert component B into higher molecular weight compounds. This causes the lactam to be split off and it must be removed from the reaction mixture, for example, by degassing. Examples of these components include terephthaloyl lactams.

If N-activated lactams are involved in which the functional group X does not represent a lactam but is rather a hydroxy, phenol or amine group, component B can be reacted without further additives.

Depending on the reaction conditions and the chemical composition of component B, the polymerization may take place with splitting or ring opening of the lactams.

Particularly preferred lactams are caprolactam and laurinlactam. The lactams can be produced in a manner known to the person of average skill in the art, for example, from monofunctional and polyfunctional cyclic ketone compounds or from aminocarboxylic acid or aminocarboxylic acid derivatives, preferably from aminocaproic acid or aminovaleric acid. Preferred compounds for component B are those containing N-substituted cyclic lactams that are activated by electrophilic substituents Y and aromatic amines, phenols or alcohols, in which case the nucleophilicity of the phenols, amines or alcohols should be varied in such a way that a fast reaction occurs only when heated. Particularly preferred are p-aminobenzoyl lactams, for example, p-aminobenzoyl caprolactam.

The radical $R^1$ refers to bivalent or multivalent aliphatic-, aromatic-, araliphatic-, cycloaliphatic-, heterocyclic- or heteroatom-containing segments. The term "heteroatom-containing" as used herein means that the spines of the aliphatic, aromatic, araliphatic or cycloaliphatic segments, in addition to C atoms, may also contain other atoms such as N, S, and P. Particularly preferred radicals $R^1$ include aromatic ethers, sulfones, thioethers and esters or amides. Examples of radicals R¹ include 1,3- and 1,4-benzene, 4,4'-stilbene, alkylene, 1,4-cyclohexane, hydrated bisphenol A after removal of the two OH groups, oligomers, polyamides, polyesters, polyethers, and polycarbonate radicals. Depending on the nature of the functional groups X and Y, radicals R¹ are derived from symmetrically or asymmetrically substituted compounds. Particularly preferred radicals R¹ include aminocarboxylic acids and aminosulfonic acids after removal of the functional groups.

The resulting mixture of component A and the polymerized component B may be a single- or multi-phase mixture. Preferred are mixtures that are characterized in that microphases of component B are dispersed in the continuous phase of component A. Preferably the percentage (as weight percent) of component B is therefore less than 50, particularly preferred is the percentage of less than 25. However, if the reaction products of component B themselves are thermoplastic, up to 90 weight percent of component B can be added.

In addition to components A and B, auxiliary agents may be added to improve the binding of the microphases. These auxiliary agents are so-called "phase forming agents" and are preferably functionalized polymers derived from component A whose functional group is able to react with groups X. Among the functional groups for which X is an amine, carboxylic acid anhydride functionalized polymers are of particular significance. For example, maleic acid anhydride grafted polypropylene is useful if component A is polypropylene, or styrene/maleic acid anhydride copolymers containing less than 50 weight percent, preferably less than 10 weight percent, maleic acid anhydride are useful if component A is polystyrene.

For microcompounds having a reinforcing effect, components are preferably selected so that components A and B are miscible in the melt, and phase separation occurs only when component B reacts. Moreover, those components B are preferred which, upon completion of the reaction, form rigid or liquid-crystalline polymers. Particularly preferred are combinations in which component A is at least one polyamide, particularly at least one of polyamide-6, polyamide-66, polyamide-4, and polyamide-11, and component B is composed of at least one p-aminobenzoyl lactam, particularly at least one of p-aminobenzoyl caprolactam and p-aminobenzoyl laurinlactam. In the case of polyamide/p-aminobenzoyl lactam, component B is added in weight percentages of <50, particularly preferred is addition in weight percentages of <10. Preferred temperatures for the process are temperatures above the softening temperature of component A.

Component A may be combined with component B before melting or after melting. Preferably, component B is added to the melt of A in the form of a powder. The functional groups of component B should be selected so that the conversion of component B takes place within less than 10 minutes. In this way, the mixing can be effected in situ, that is, during processing of component A, such as melt-extrusion. During the polymerization of component B, varying percentages of the lactams are separated and can be removed from the melt by applying a vacuum.

In the case of polyfunctional lactams, where the addition of a diol or a diamine is required, the polylactam may be pre-mixed with component A and may then be combined with the diol or diamine component, or the procedure may be reversed. Particularly preferred are processes in which p-aminobenzoyl lactam is measured into a melt composed of polyamide-6 at a temperature of >220° C. and polymerization takes place within less than 10 minutes. The production of the mixtures may be effected, for example, in a single or twin screw extruder, or in a kneading machine.

In addition to components A and B, further additives and auxiliary agents may be added. Examples of such additives and agents include antioxidants, light protection agents, flame retardants, softeners, flexibilizers, elastomers, fillers, fibers, short fibers, dyestuffs, pigments and other substances customarily employed in connection with the processing of thermoplastic substances.

The mixtures according to the invention can be processed by procedures customary for thermoplastics and are therefore suitable for the production of injection molded, extruded and blow molded shaped objects, of adhesives, coatings, fibers, films and thin sheets.

The invention can be better understood from the following examples offered by way of explanation not limitation.

MANUFACTURE

EXAMPLE 1

In a RHEOMIX measuring kneader by Haake having a 60 ml measuring chamber that is preheated to 220° C., 31 g of polypropylene (melt index 2 g/min at 230° C./2.13 kg) and 5 g of carboxylic acid anhydride functional polypropylene (0.37 weight % grafted maleic acid anhydride, melt index 125.3 g/min at 230° C./2.16 kg) were melted for 2 minutes at 220° C. and 60 rpm. Then, 4 g of p-aminobenzoyl caprolactam were added to the melt. Within 30 seconds the torque dropped from 4.3 to 0.5 Nm, and rose again to 3.8 Nm over the next 30 seconds. Then, kneading took place for another 7 minutes.

EXAMPLE 2

The procedure was the same as in Example 1, but instead of 10 weight %, 30 weight % of p-aminobenzoyl caprolactam was added to the melt.

EXAMPLE 3

In a RHEOMIX measuring kneader by Haake having a 60 ml mixing chamber that is preheated to 240° C., 36 g of polyamide-6 (median molecular weight of 23,000 g/mol) were melted for 2 minutes at 240° C. and 60 rpm. Then, 4 g of p-aminobenzoyl caprolactam were added. Within 30 seconds the torque dropped from 2.5 to 0.5 Nm, and rose again to 2.4 over the next minute. No change in torque was noted during the next 2.5 minutes.

EXAMPLE 4

The process of Example 1 was used to mix 0.8 g of p-aminobenzoyl caprolactam and 39.2 g of polyamide-6.

EXAMPLE 5

The process of Example 1 was used to mix 2 g of p-aminobenzoyl caprolactam and 38 g of polyamide-6.

CHARACTERIZATION

Electron Microscopy

The polypropylene alloys produced in Examples 1–5 were contrasted with ruthenium tetroxide. Thin slices having a diameter between 70 and 120 nm were produced by means of an ultramicrotome (ULTRACUT E by Reichert Jung equipped with a diamond blade). Photographs were taken with a CEM 902 transmission electron microscope by Zeiss employing elastic bright field imaging and showed needle-shaped microphases having a diameter of about 300 nm and a length of about 1200 nm.

Films having a thickness of about 0.1 mm were produced in a press at 240° C. and these were contrasted for 12 hours at 90° C. with 10% phosphotungstic acid. After being embedded in epoxy resin, slices having a thickness of about 0.1 μm were prepared in a wet cutting process. The electron microscope revealed bundles of fibrils having the form of fine, needle-shaped crystals.

MECHANICAL TEST

The polymer mixtures produced in Examples 1-5 were pressed in a vacuum at 260° C. to yield plates having a thickness of 1.6 mm. For tensile stress measurement, 18 mm specimens were produced true to scale according to DIN [German Industrial Standard] 53455 and were measured with a crosshead velocity of 10 mm/min. Before the measurement, the polyamide specimens were conditioned for 3 days at 60° C. in water, then 4 days at room temperature. The Youngs modulus, yield stress and elongation at rupture were determined for the five specimens and for a polyamide control X not in accordance with the present invention. The results are compiled in the table below.

| Example | Component A | Component B (weight %) | Youngs modulus (MPa) | Yield Stress (MPa) | Elongation at Rupture (%) |
|---|---|---|---|---|---|
| 1 | polypropylene | 10 | 1200 | 33 | 19 |
| 2 | " | 30 | 1240 | 27 | 9 |
| X | polyamide-6 | 0 | 810 | 38 | 150 |
| 3 | " | 10 | 1620 | 30 | 15 |
| 4 | " | 5 | 1440 | 39 | 25 |
| 5 | " | 2 | 1120 | 30 | 15 |

It will be understood that the above description of the present invention is susceptible to various modifications, changes and adaptations, and the same are intended to be comprehended within the meaning and range of equivalents of the appended claims.

What is claimed is:

1. A polymer mixture including microphases of melt-polymerized material in a thermoplastic polymer, the polymer mixture comprising:
a component A composed of at least one thermoplastic polymer which is one of (i) selected from the group consisting of olefin homopolymers, olefin copolymers, styrene homopolymers, and styrene copolymers or is (ii) a polar, heteroatom-containing thermoplastic polymer selected from the group consisting of polyamides and polyamidimides; and melt-polymerization reaction products of from 0.2-90 weight % of a component B bases on the weight of the polymer mixture composed of at least one compound having the structure $X_n$—$R^1$—(Y—N—$R^2$—CO)$_m$, wherein X is $NH_2$, $NHR^3$, or OH; Y is CO, $SO_2$, or $R^5P=O$; $R^1$ is a (n+m) valent aromatic radical or an aliphatic radical having the formula $C_x H_{(2x+2-m-n)}$ or a cycloaliphatic radical of the formula $C_xH_{(2x-m-n)}$ with $1 > x > 15$; $R^2$ is a bivalent radical of the formula $(CH_2)_z$ with $1 < z < 15$; and $R^3$ and $R^5$ are monovalent aromatic radicals or monovalent aliphatic radicals of the formula $C_pH_{(2p+1)}$ or monovalent cycloaliphatic radicals of the formula $C_pH_{(2p-1)}$ with $1 < p < 20$ and radicals $R^1$, $R^2$, $R^3$ and $R^5$ optionally contain heteroatoms in place of the formulas recited for $R_1$, $R_2$, $R_3$ and $R_5$ and are optionally unsaturated; and n and m are integers with $1 < m$ and $n < 5$, the polymerization reaction products being linear, branched or cross-linked, high or low molecular weight polymers constituting microphases.

2. The polymer mixture according to claim 1, wherein component B is composed of compounds having the structure

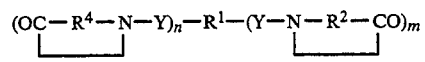

in which $R^4$ is a bivalent aliphatic radical of the formula $C_zH_{2z}$, where $1 < z < 15$, or a related radical which is one of an unsaturated radical or a heteroatom-containing radical, and in which component B is reacted with aromatic, aliphatic, cycloaliphatic or araliphatic diamines having up to 40 carbon atoms in a lactam/diamine molar ratio ranging from greater than 0.5 to less than 1.5.

3. The polymer mixture according to claims 1 or 2, wherein component A is a thermoplastic polymer selected from the group consisting of polyethylenes of a high or low density, ethylene copolymers with 1-olefins, ethylene copolymers with at least one of vinyl acetate, methacrylic acid or their derivatives, polypropylenes, propylene copolymers, styrene homopolymers, and styrene copolymers.

4. The polymer mixtures according to claims 1 or 2, wherein component A is a thermoplastic polymer selected from the group consisting of ethylene copolymers with 1-butene or 1-octane; ethylene copolymers with at least one of vinyl acetate, methacrylic acid, and methyl methacrylate, ethyl methacrylate or butyl methacrylate; propylene copolymers with ethylene; and styrene copolymers with one of methacrylic acid esters, butadiene, acrylonitrile or butadiene and acrylonitrile.

5. The polymer according to claims 1 or 2, wherein component A is a polar, heteroatom-containing thermoplastic polymer.

6. The polymer mixture according to claims 1 or 2, wherein $R^2$ is a bivalent aliphatic radical.

7. The polymer mixture according to claims 1 or 2, wherein the at least one thermoplastic polymer is an alloy of a polymer of group (i) and a polymer of group (ii).

8. The polymer mixture according to claim 1, wherein the at least one thermoplastic polymer is an alloy of a polar, heteroatom-containing thermoplastic polymer with the at least one thermoplastic polymer selected from the group consisting of polyethylenes of high or low density, ethylene copolymers with 1-olefins, ethylene copolymers with at least one of vinyl acetate, methacrylic acid or their derivatives, polypropylenes, propylene copolymers, styrene homopolymers, and styrene copolymers.

9. The polymer mixture according to claim 1, wherein the at least one thermoplastic polymer is an alloy of a polar, heteroatom-containing thermoplastic polymer with the at least one thermoplastic polymer selected from the group consisting of the ethylene copolymers with 1-butene or 1-octene; ethylene copolymers with at least one of vinyl acetate, methacrylic acid, and methyl methacrylate, ethyl methacrylate or butyl methacrylate; propylene copolymers with ethylene; and styrene copolymers with one of methacrylic acid esters, butadiene, acrylonitrile or butadiene and acrylonitrile.

10. The polymer mixture according to claims 1 or 2, wherein component A is a polar heteroatom-containing thermoplastic polymer selected from the group consisting of homopolyamides; copolyamides, wherein the homopolyamides and copolyamides are produced by polycondensation of aliphatic, araliphatic, aromatic, cycloaliphatic diamines with aromatic, aliphatic, cycloaliphatic, heterocyclic dicarboxylic acids or by polymerization of lactams of the type $HN-R^2-CO$; polyesters of aromatic dicarboxylic acids with aliphatic diols, polyarylates based on aromatic dicarboxylic and tricarboxylic acids and aromatic diols; and polyethers.

11. The polymer mixture according to claims 1 or 2, wherein component A is a polar, heteroatom-containing thermoplastic polymer selected from the group consisting of polyethylene terephthalate, polybutylene terephthalate, hydroxybenzoate copolymers, and hydroquinone copolymers with aromatic dicarboxylic acids.

12. The polymer mixture according to claims 1 or 2, wherein component A is a polar, heteroatom-containing thermoplastic polymer which is a hydroquinone copolymer with aromatic dicarboxylic acids selected from the group consisting of terephthalic acid; isophthalic acid; trimellithic acid; 2,6-naphthalene acid; 1,4-naphthalene acid; and 4,4′-diphenyldicarboxylic acid.

13. The polymer mixture according to claims 1 or 2, wherein component A is a polar, heteroatom-containing thermoplastic polymer which is at least one polyamide selected from the group consisting of polyamide-6, polyamide-66, polyamide-11, and polyamide-4.

14. The polymer mixture according to claims 1 or 2, wherein component B is composed of aromatic-, aliphatic-, cycloaliphatic-, araliphatic-, heterocyclic-, or heteroatom-containing compounds including an amino group and an N-carbonyl lactam group.

15. The polymer mixture according to claim 14, wherein the amino group is an aromatic amino group.

16. The polymer mixture according to claim 14, wherein the N-carbonyl lactam group is selected from the group consisting of an N-carbonyl caprolactam and N-carbonyl laurinlactam.

17. The polymer mixture according to claim 16, wherein the N-carbonyl lactam group is a p-aminobenzoyl lactam.

18. The polymer mixture according to claim 1, wherein component A and component B are miscible when melted.

19. The polymer mixture according to claim 18, wherein the microphases are anisotropic.

20. The polymer mixture according to claim 19, wherein the microphases are needle-shaped and have a length to diameter ratio of $>1$.

21. The polymer mixture according to claims 1 or 2, wherein the melt polymerization reaction products include a low or high molecular weight reaction product which is insoluble in component A.

22. The polymer mixture according to claims 1 or 2, wherein component A includes a low or high molecular weight compound which has available a functional group that is able to react with an end group of component B or its low or high molecular weight reaction products, and wherein the polymer mixture has a mole ratio of X to said functional group of component A, which is less than 1.

23. The polymer mixture according to claim 20, wherein X is $NH_2$ and wherein component A is selected from the group consisting of maleic acid anhydride grafted olefin homopolymers, maleic acid anhydride grafted olefin copolymers, and copolymers of maleic acid anhydride and olefins.

24. The polymer mixture according to claim 1, wherein component A softens at a softening temperature, and wherein the melt polymerization reaction products soften above the softening temperature of component A.

25. The polymer mixture according to claim 24, wherein component A decomposes at a decomposition temperature, and wherein the melt polymerization reaction products soften above the decomposition temperature of component A.

26. The polymer mixture according to claim 1, wherein $R^1$ of component B is a radical composed of rigid segments which form low or high molecular weight, stiff-chained, melt polymerization reaction products.

27. The polymer mixture according to claim 26, wherein the melt polymerization reaction products are liquid-crystalline reaction products.

28. The polymer mixture according to claims 1 or 2, further comprising at least one additive.

29. The polymer mixture according to claim 28, wherein the at least one additive is selected from the group consisting of fillers, stabilizers, pigments, dyestuffs, and softeners.

30. The polymer mixture according to claims 1 or 2, wherein component A is a continuous phase of the polymer mixture, and wherein component B is present as less than 50 weight percent of the mixture of A and B.

31. The polymer mixture according to claim 29, wherein component B is present as less than 25 weight percent of the mixture of A and B.

32. The polymer mixture according to claims 1 or 2, wherein the melt polymerization reaction products are thermoplastic, and wherein component B is present as up to 90 weight percent of the mixture of A and B.

33. The polymer mixture according to claims 1 or 2, wherein $m=n=1$.

34. The polymer mixture according to claim 2, wherein the at least one thermoplastic polymer is an alloy of a polar, heteroatom-containing thermoplastic polymer with the at least one thermoplastic polymer selected from the group consisting of polyethylenes of high or low density, ethylene copolymers with 1-olefins, ethylene copolymers with at least one of vinyl acetate, methacrylic acid or their derivatives, polypropylenes, propylene copolymers, styrene homopolymers, and styrene copolymers.

35. The polymer mixture according to claim 2, wherein the at least one thermoplastic polymer is an alloy of a polar, heteroatom-containing thermoplastic polymer with the at least one thermoplastic polymer selected from the group consisting of the ethylene copolymers with 1-butene or 1-octene; ethylene copolymers with at least one of vinyl acetate, methacrylic acid, and methyl methacrylate, ethyl methacrylate or butyl methacrylate; propylene copolymers with ethylene; and styrene copolymers with one of methacrylic acid esters, butadiene, acrylonitrile or butadiene and acrylonitrile.

* * * * *